United States Patent [19]
Hardwick et al.

[11] Patent Number: 5,649,050
[45] Date of Patent: Jul. 15, 1997

[54] APPARATUS AND METHOD FOR MAINTAINING DATA RATE INTEGRITY OF A SIGNAL DESPITE MISMATCH OF READINESS BETWEEN SEQUENTIAL TRANSMISSION LINE COMPONENTS

[75] Inventors: John C. Hardwick, Somerville; Jae S. Lim, Winchester, both of Mass.

[73] Assignee: Digital Voice Systems, Inc., Burlington, Mass.

[21] Appl. No.: 31,534

[22] Filed: Mar. 15, 1993

[51] Int. Cl.$^6$ .................................................... G10L 3/02
[52] U.S. Cl. ................................................ 395/2.12; 395/2.2
[58] Field of Search .............................. 395/2.1, 2, 2.2, 395/2.36, 2.37, 2.09, 2.12, 2.32, 2.38

[56] References Cited

U.S. PATENT DOCUMENTS

| | | | |
|---|---|---|---|
| 4,371,895 | 2/1983 | Koga | 358/136 |
| 4,903,301 | 2/1990 | Kondo et al. | 381/30 |
| 5,097,507 | 3/1992 | Zinser et al. | 381/31 |
| 5,125,101 | 6/1992 | Johnson et al. | 455/9 |
| 5,175,769 | 12/1992 | Hejna, Jr. et al. | 381/34 |
| 5,177,740 | 1/1993 | Toy et al. | 370/100.1 |
| 5,182,753 | 1/1993 | Dahlin et al. | 371/43 |
| 5,216,744 | 6/1993 | Alleyne et al. | 395/2 |
| 5,283,811 | 2/1994 | Chennakeshu et al. | 375/14 |

OTHER PUBLICATIONS

High Quality Time Scale Modification of Speech Signals Using Fast Synchronized-Overlap-Add Algorithms. Hardam IEEE/1990.

Time Scale Modification of Complex Acoustic Signals Quatieri et al. IEEE/ 1993.

Subband Speech Coding and Matched Convolutional Channel Coding Coding for Mobile Radio Channels Cox et al. IEEE/1991.

APCO Project 25 Vocoder Description (Jul. 15, 1993).

Griffin et al., Multiband Excitation Vocoder, IEEE Trans. on Acoustics, Speech and Signal Proc., vol. 36, No. 8 (Aug. 1988).

Griffin et al., Signal Estimation from Modified Short-Time Fourier Transform, IEEE Trans. on Acoustics, Speech, and Signal Proc., vol. ASSP-32, No. 2 (Apr. 1984).

*Primary Examiner*—Allen R. MacDonald
*Assistant Examiner*—Richemond Dorvil
*Attorney, Agent, or Firm*—Fish & Richardson P.C.

[57] ABSTRACT

The effects of mismatch between the data rate states of at least first and second transceiver components in a signal transmission line for transmitting an original data signal are minimized by an apparatus that includes buffer means located between first and second transceivers for storing signal components, and data rate matching means for receiving a signal at a data rate that matches the data rate state of the first transceiver and transmitting a signal at a data rate that matches the data rate state of the second transceiver.

25 Claims, 7 Drawing Sheets

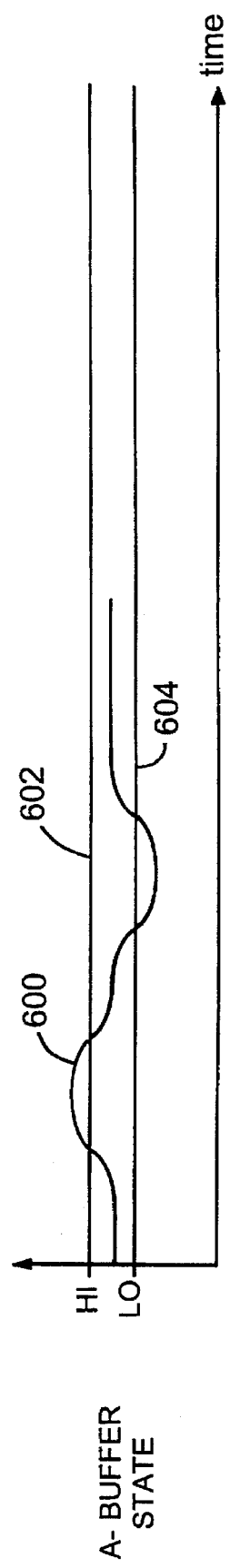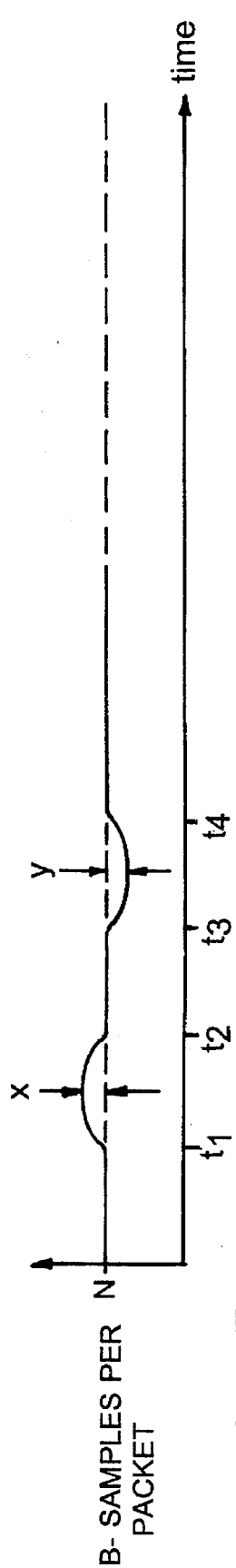

APPARATUS AND METHOD FOR MAINTAINING DATA RATE INTEGRITY OF A SIGNAL DESPITE MISMATCH OF READINESS BETWEEN SEQUENTIAL TRANSMISSION LINE COMPONENTS

The present invention relates in general to the field of signal transmission and in specific, to the field of overcoming problems with signal channel integrity. Particularly, the invention relates to maintaining data rate integrity of a signal in a system where a mismatch arises between the signal transmission readiness (or data rate state) of sequential components in a transmission line.

BACKGROUND

In all forms of signal transmission, a signal is transmitted over a channel or transmission line. The channel or transmission line includes a physical medium through which the signal travels, such as a wire, optical fiber, or the atmosphere. Such data transmission systems are referred to below interchangeably as "channels" or "transmission lines," both terms being taken to mean any physical system through which a signal can travel. Another aspect of the channel is the readiness of signal handling elements that make up the channel to receive or send signal components. For signals to travel over the channel smoothly, there must be no physical barriers that disrupt the physical integrity of the channel, such as breaks in wires, or interfering structures that obstruct signals such as radio, or optical Further, receiving signal handling elements must be ready to accept a signal that has been transmitted by transmitting elements in the line, and signal transmitting elements must be ready to send a signal when other elements need to receive one. By ready, it is meant properly warmed up, booted, etc., and not occupied by other tasks.

Often the data rate state of different transmitter/receiver ("transceiver") components in a transmission line are mismatched. This causes problems. Specific instances of the problem abound. For instance, a radio frequency transmission is made from a transmitter to a receiver. In a digital system, as shown schematically in FIG. 1, the transmitting user pushes a button 106 to initiate the transmission, then initiates the generation of a signal or speaks into a microphone 100. The microphone is connected to an analog to digital converter 102, which is connected to a modulator 104. The converter converts the analog electric signal to a digital signal representing the sound made by the user, for instance, speech.

The modulator 104 manages the stream of digital signals so that it is in a form that can be transmitted over the channel 108. The digital, electric signal is transduced into an electromagnetic radiation, radio frequency signal, and broadcast through the medium of the atmosphere. At the receiver 110, the radiation is picked up by a receiving apparatus, such as an antenna, passed through demodulator 112, transformed into an analog electric signal by D/A converter 114 and transformed into whatever form of signal is desired, for instance, an analog acoustic signal such as voice, generated by a loud speaker 116.

The problem arises because after the transmitting operator pushes the start button 106, it takes a finite period of time before the radio communication channel 108 is "open." By open, it is meant before the components that make up the receiver 110 and transmitter 120 are mutually in condition to receive a signal that has been transmitted. For a typical radio link, the time to open the channel may be on the order of between one millisecond and two seconds. Thus, if the transmitting operator begins talking immediately or any time before the channel 108 is open the first moments of the signal will not be received by the receiver 110. Part of the signal will be lost.

Not only is this phenomenon annoying, but it also can present circumstances that defeat or hamper the purposes of the communication. For instance, in a military or police situation, if the message to be transmitted is a spoken, curt "Don't Shoot!" and the channel does not open until after the transmission of the word "Don't," the message received is "Shoot!" which is wrong, drastically so. Many other scenarios exist where the initial portion of the signal to be transmitted is crucial to the message intended.

One way that the radio transmission problem has been addressed is to run the entire signal through a buffer 122, which delays signal transmission for a brief period of time, until the channel has opened. One drawback to this approach is that the entire signal is then delayed. If the signal is being used to synchronize or otherwise coordinate activities happening at different physical locations, the ongoing delay presents a problem. Further, if the channel closes unexpectedly while the transmitter is transmitting, and then opens again at a later time, information will be lost due to the subsequent channel closing.

Another instance where channel integrity problems arise is in the context of several different signal transceiver components in a transmission line that transmit or receive a signal. Each transceiver component may be driven by its own clock. The clocks may be running at nominally different speeds (e.g. 8 kHz and 16 kHz). Further, the nominal speeds may not be absolutely fixed, with each clock tending to drift with respect to a significantly more stable standard, and thus, with respect to the nominal and actual speed(s) of the other clock(s). Therefore, it is difficult to coordinate the flow of the signal through the signal components.

For instance, as shown schematically in FIG. 2A, in a voice transmission system 200, the components of one portion of the system may include an analog to digital converter 202 running under the influence of a first clock 204, which digitizes an analog signal AS (FIG. 2B) by sampling its amplitude at a specified frequency $F_1$. The sampled signal is presented to modulator 208, which is run by a different clock 210.

The A/D converter 202 digitizes the amplitude of analog signal AS every n cycles of clock 204. The modulator 208 takes a packet of a certain number of signal samples every w cycles of clock 210 and puts those packets in a form that can be used by the rest of the system, such as a radio link channel.

Ideally, the rate at which A/D converter 202 generates signal samples, and the rate at which modulator 208 accepts packets of signal samples, are correlated, so that the modulator 208 is ready to accept a packet of sampled signals when it is presented, and vice versa. If the clocks 204 and 210 were perfectly regular, this would be simple to accomplish. For instance, if A/D converter 202 runs at 16 kHz and samples once every 20 cycles or 1/800 second (200 samples every 1/4 second) and modulator 208 runs at 8 kHz and takes a packet of 200 samples every 2000 cycles (1/4 second), everything will work smoothly. (These sampling rates are artificial, designed for discussion purposes only.) However, the clocks are not perfect, each one drifting from its nominal value. Consequently, over time, the A/D converter 202 and modulator 208 can get out of synchronization, and samples will be presented to modulator 208 before it is ready to handle it or it will call for samples before they are ready.

For instance, if the clock 204 beats slightly faster than the clock 210, such that every ¼ second A/D converter samples 220 times, after ¼ second, 220 samples will be available, which is more than the 200 that modulator 208 can handle. Samples will be dropped. A similar problem arises if clock 204 beats too slowly. If samples are not available when called for, the system will send spurious signals.

Known systems have addressed this problem simply by periodically discarding a portion of the signal when a backlog arises or sending default signals if a deficit arises. This is undesirable, because the signal quality is compromised. It is not possible to simply use a large buffer, because, if there is a mismatch that persists for a long enough time, any buffer will overflow, no matter how large it is. Similarly, to overcome a deficit, it would not be possible to begin with a stockpile of buffered samples, because over a long enough time, the stockpile would run empty.

Thus, it is an object of the invention to provide an apparatus that maintains the integrity of a signal, despite a mismatch in the readiness of transceiver components that make up the channel, or transmission line over which the signal will pass. It is an object of the invention to provide an apparatus and a method for transmitting speech over a channel, such that no information content of the speech is lost, despite channel interruptions and such that a permanent buffered delay is not established. It is another object of the invention to provide such an apparatus that does not distort important aspects of a speech signal, such as pitch and frequency. Yet another object of the invention is to transmit data in a system having more than one clock and to avoid the problems associated with the drift in the clocks.

SUMMARY

A preferred embodiment of the invention is an apparatus for minimizing the effects of mismatch between the data rate states of two transceiver components in a signal transmission line. The apparatus includes a buffer for storing the signal located between the two transceiver components. Means are provided for matching the data rate from the buffer with the data rate state of the second, transceiver component, despite a non-matching data rate state of the first transceiver component. In a preferred embodiment, the likely data rate of the second component is zero, or a closed channel. The apparatus includes means to detect the subsequent opening of the second component and release of the buffer contents. In order to provide a signal that does not lag behind the original signal, a time scale modification apparatus compresses the time scale of the signal transmitted from the buffer, so that the signal catches up to the timing of the original signal. The invention is particularly useful in connection with the transmission of a signal representing speech over a communications channel.

Another preferred embodiment of the invention is an apparatus that monitors the relative data rate states of the first and second transceiver components, and compresses or expands as necessary the time scale of the data signal transmitted from a buffer interposed between the two components, to accommodate the data rate mismatch. The apparatus may monitor the relative data rates by monitoring the fullness of the buffer with respect to a predetermined level or levels.

Yet another preferred embodiment of the invention is a method for minimizing the effects of mismatch between the data rate states of at least first and second transceiver components in a signal transmission line for transmitting an original time varying data signal by monitoring the data rate parity between the first and second transceiver components. If there is a mismatch in data rates, the time scale of signals received by the second transceiver relative to the corresponding signals transmitted by the first transceiver is modified. However, if there is no mismatch, the signal is allowed to be transmitted from the first transceiver component to the second transceiver component without any time scale modification.

BRIEF DESCRIPTION OF THE FIGURES

These and other features, aspects, and advantages of the present invention will become better understood with regard to the following description, appended claims and accompanying drawings, where:

FIG. 6a and FIG. 6b are a graphical representation of the state of a buffer, as compared to the output of a time scale modification component in a system such as shown in FIG. 5A.

DETAILED DESCRIPTION OF PREFERRED EMBODIMENTS OF THE INVENTION

Figure 1:
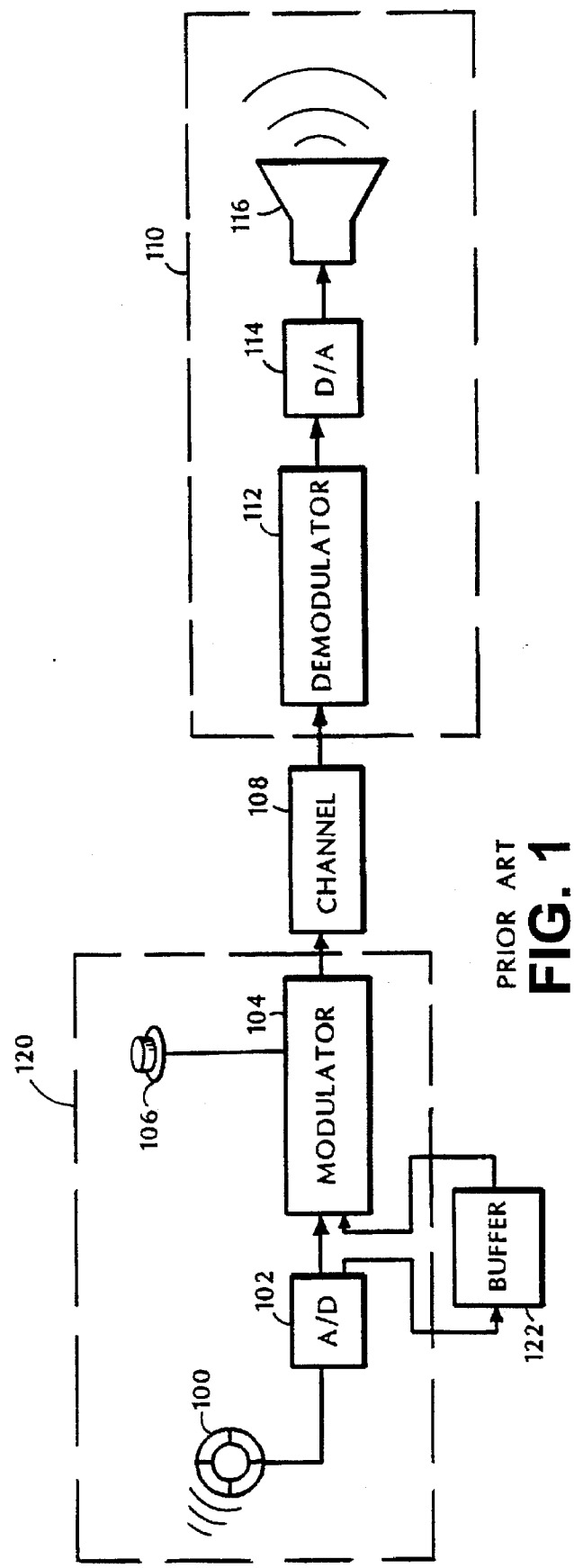
FIG. 1 is a schematic representation of a radio link of the prior art, which experiences the problem that the present invention overcomes.
Figure 3:
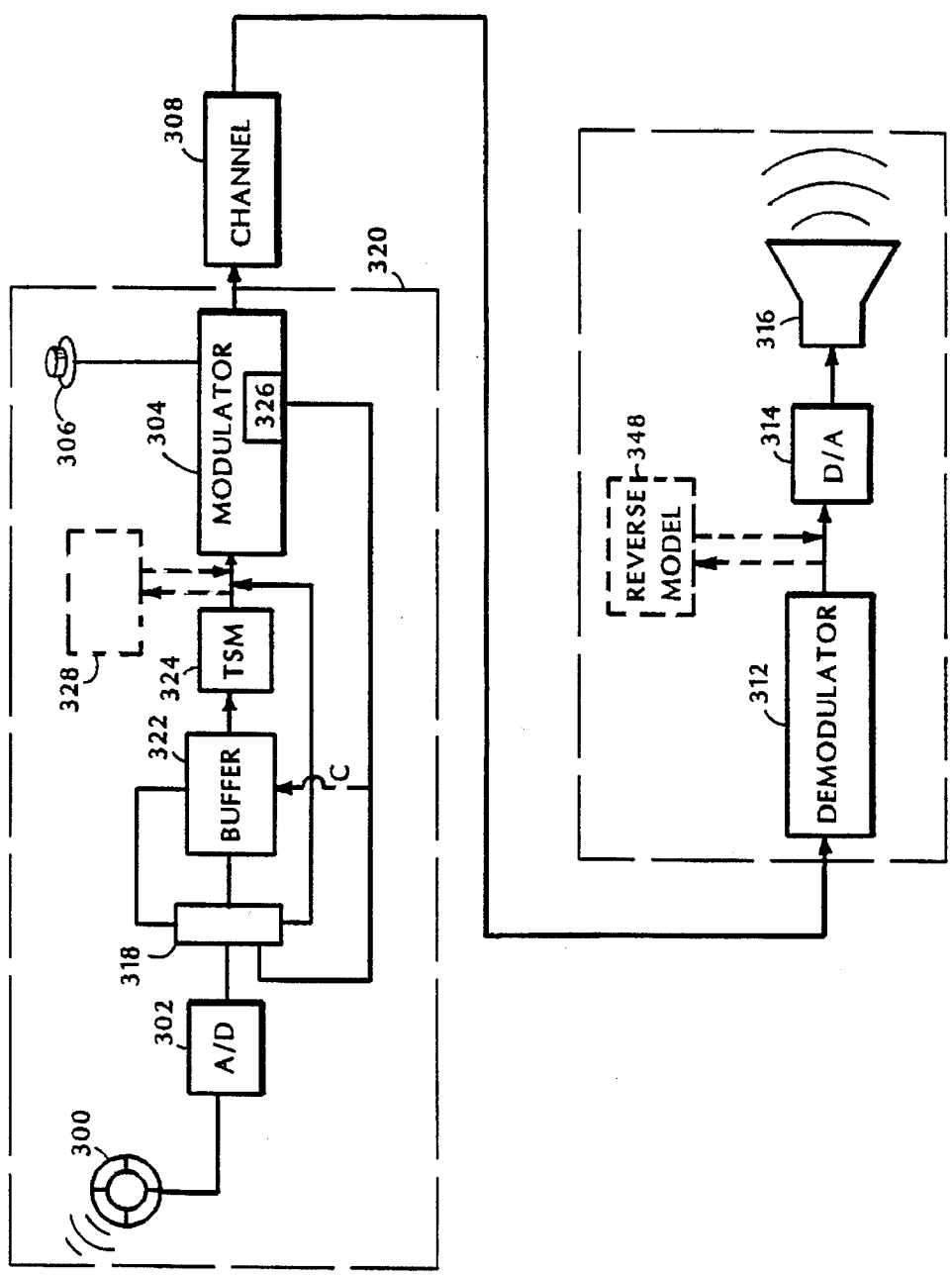
FIG. 3 is a schematic block diagram showing the components of a voice transmission system according to the present invention.

A preferred embodiment of the apparatus of the invention is shown schematically in block diagram form in FIG. 3. The apparatus illustrated is a voice transmission apparatus, of the same general sort as the prior art type shown in FIG. 1. The apparatus is used to transmit a signal, typically based on a user's spoken voice, over a channel, such as a radio frequency channel.

A transmitting user speaks and a microphone 300 receives acoustic signals resulting from the speech, and generates corresponding analog electrical signals, typically varying in amplitude. Analog to digital converter 302 converts the analog electrical signal to a digital electrical signal. Following A/D converter 302, a switch 318 directs the signal either to buffer 322 or around buffer 322 and time scale modification module 324 ("TSM"), depending on the open or closed state of the channel 308, as indicated by feedback module 326, typically a component of modulator 304. Feedback module 326 can be implemented in a number of ways, as will be understood by one of ordinary skill in the art, such as a receiver which monitors signals acknowledging proper receipt of transmitted voice packets. The digital signal is passed through first-in, first-out ("FIFO") buffer 322 the operation of which is explained below. From the buffer, the signal passes through TSM 324, which is typically implemented as a digital signal processing chip, such as a TMS 320C31, sold by Texas Instruments Co.

The output of the TSM 324 is provided to modulator 304, which conventionally prepares the signal for transmission over channel 308, for instance a radio transmission channel. At the downstream end of the channel 308, the signal is treated by demodulator 312, which prepares it for transmission over the appropriate signal transmission line within the receiving unit 310, typically a digital electronic signal. This signal is converted by digital to analog converter 314 into an analog signal, which may be further transmitted, recorded, or converted by a loudspeaker 316 into an acoustic signal. Rather than passing the signal to digital to analog converter 314, the signal can be digitally stored, reconfigured, or otherwise treated.

The illustrated apparatus accomplishes the objects of the invention as follows. When the operator pushes button 306 to open channel 308 the apparatus commences the process of opening the channel. This entails certain steps, depending on the exact nature of the channel, and may take between one millisecond and two seconds. First, the operation of the invention will be explained for the case that the channel is ready to receive a signal when a signal is presented to the channel (which is not the typical case immediately upon pressing the button 306, but which is explained first for simplicity).

Initially, the buffer 322 is empty. Feedback module 326 monitors the open/closed condition of channel 308 and provides information regarding this condition to switch 318. If the channel 308 is open, a control signal so indicating is provided by feedback module 326 to switch 318, which directs the digital output from A/D converter 302 around buffer 322 and TSM 324, directly to modulator 304, and the apparatus operates as does the prior art. The message signal is modulated and placed on channel 308, from which it is taken by demodulator 312. The demodulated message signal is treated according to the various outcomes mentioned above.

If, however, an acoustic signal is presented to microphone 300 when the channel 308 is not ready to accept a message signal (i.e. "closed"), this non-ready condition is detected by feedback module 326, and is indicated to switch 318, which directs the message signal into buffer 322.

The message signal accumulates in buffer 322, until some prearranged condition arises. For instance, the buffer can be sized to always accept a timewise slice of the digital message signal of a fixed duration, with the duration being calculated to be larger than would ever be reasonably necessary, such as, for instance, three full seconds. A control signal from feedback module 326 can be provided to buffer 322 (as indicated along dotted line C) to trigger release of the buffer contents upon the assumption of the channel 308 of a predetermined ready state.

The digital message signal accumulates in buffer 322 until it is determined that the channel 308 is ready to accept a message signal. The message signal is then transmitted from the buffer 322. If the message signal were simply sent to the modulator 304, the transmitted message signal would always lag behind the actual input to microphone 300 by the residence time in the buffer, as well as the normal signal propagation delay through the components (which, as compared to the residence time in the buffer, is negligible). (For the purpose of the following discussion, it will be assumed that there is no time delay for a signal to pass from input to microphone 300 to the output of modulator 304, although, in practice, there is a small delay.) For the reasons mentioned above, this buffer lag artifact is undesirable.

The invention overcomes this permanent lag by use of a TSM module 324. This module compresses the time scale of its output signal as compared to the time scale of its input signal, so that the message content of the output is speeded up. (The unit can typically also slow down the output as compared to the input, however that is not useful for the speech transmission aspect of the invention presently under discussion. It is important for another aspect of the invention, discussed below.) Thus, for instance, if the message signal presented to the TSM represents speech at a rate of 3 syllables per second, the output will be at a rate of 3P, where P>1.

To explain what is meant by "compressing the time scale," a simple, example is in order. In speech, much of the time is taken up by silence. Periods of silence come between certain words, at the end of sentences, etc. A crude method of compressing the time scale of a signal representing speech would be to eliminate or shorten some or all of those portions of the signal that represent the silences. Upon reconversion of the modified signal back into an acoustic signal, the result would be speech with shorter, or fewer periods of silence. The words might run together, but the speech would have the same pitch. (It would not sound higher in pitch, such as would be the case if an analog phono record were simply replayed at a speed higher than that at which it was recorded.) Similarly, to expand the time scale of a signal, the silences can be extended, or additional silences can be added between words.

There are, of course, more sophisticated methods for modifying the time scale of a signal, however, it is not necessary to discuss them at this time. Further, if the signal is not speech, but rather some other signal, then different ways can be used to modify the time scale. Typically, it is a goal to identify a portion of the signal which does not convey information (or is otherwise relatively unimportant in light of the purpose for which the signal is being transmitted) and to eliminate or modify this portion. In speech, such a portion is silence. If the signal represents a pictorial image, white space or black space may be eliminated. If the signal is a video signal, the frame rate could be changed. Thus, it can be seen, that the technique by which the time scale of the signal is modified depends on the information content of the signal.

Figure 4:
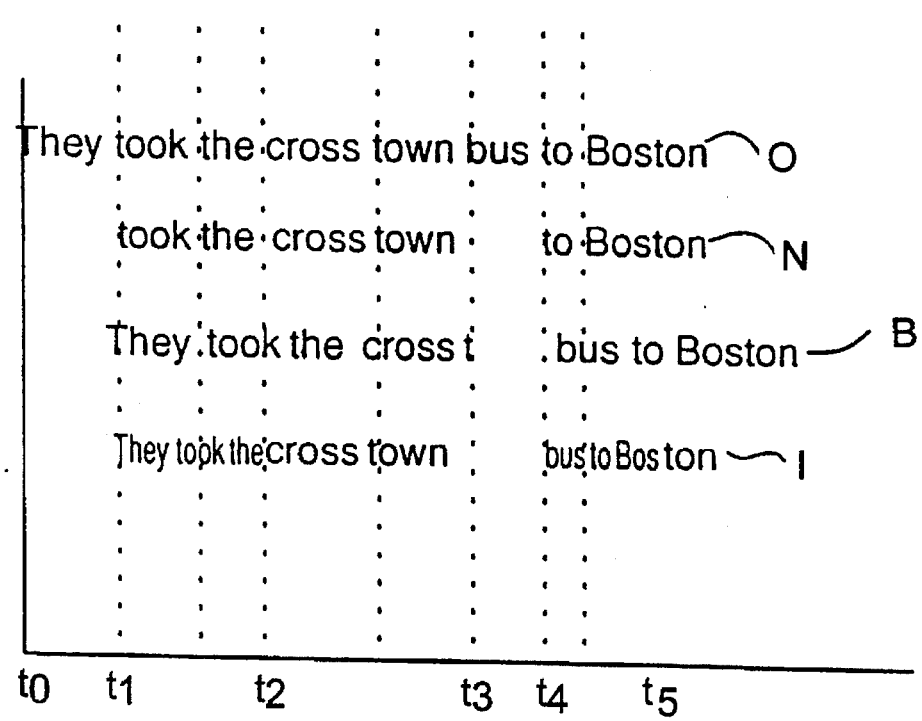
FIG. 4 is a graphical representation of a signal representing a sentence of speech in real time as spoken by a transmitting user, as compared to: the signal transmitted: without any special treatment; through a buffer; and with use of the apparatus of the invention.

The effect of the apparatus of the invention on the signal that is transmitted is shown schematically in FIG. 4. FIG. 4 shows three signals representing transmission of the utterance, "They took the cross town bus to Boston," each plotted on a common time axis (horizontal axis). The original utterance as spoken into a microphone is indicated at O. The transmission button is taken to have been pushed at time $t_0$. The utterance O is plotted with respect to time, assuming no time delay between pushing the transmission button 306 and speaking. Utterance N is the signal that would be transmitted over the channel 308 in the absence of the invention, while signal B is the signal that would be transmitted over the channel 308 with a buffer alone, but without implementation of the invention. Signal I is the signal that is transmitted over the channel 308 with an embodiment of the invention implemented.

In this scenario the speaker spoke immediately upon pushing the button, without waiting for the channel to become open. In other words, there is an initial offset of duration $t_1$ minus $t_0$ between the time a signal received by microphone 300 would have been presented to the channel 308 (in the absence of the invention) and the time the channel would have become ready to accept a signal for transmission. In the normal case, N, the beginning portion of the signal, the utterance "They," is lost, because the channel is not prepared to accept it when it is delivered. In the buffered case, B, no signal is transmitted until $t_1$. The entire resultant signal lags behind the normal signal N.

Signal I is the signal that would be transmitted over channel 308 in the presence of the invention. During that initial time before $t_1$, the signal accumulates in buffer 322. When the channel 308 becomes ready to accept a signal, buffer 322 releases its contents to TSM 324, which compresses the time scale of the signal, so that the output from TSM is speeded up as compared to the input to TSM. Inspection of signal I, as compared to signal N or signal B, shows that the utterances of the three signals are identical, however, the duration of the utterance is compressed in signal I, so that over a short period of time, signal I "passes" signal B and "catches up" to signal N. The catch-up period is between the times indicated at $t_1$ and $t_2$.

It is not possible, nor is it desirable, to continue the speeded up recreation of the signal indefinitely. If such speeded up recreation were continued, the buffer would become empty, and there would be the same problem as the prior art, i.e., gaps in the signal. Thus, when parity of signals I and N is reached, at time $t_2$, such as indicated by buffer 322 becoming empty or achieving a predetermined emptiness threshold, switch 318 directs the signal around buffer 322 and TSM 324, sending the signal directly to modulator 304. Thus during the time period between $t_2$ and $t_3$, both signals (N and I) should have the same content at the same times.

If the channel becomes incapable of receiving a signal during transmission, for instance at time $t_3$, but a short time later it becomes capable again, such as at $t_4$, the normal signal N would suffer a blackout of all utterances presented to the channel 308 during the blackout period. Thus, the utterance "bus" is lost. Similarly, for the buffered signal B, which differs from the normal signal only in the time lag, all utterances presented to the channel during the blackout period will be lost. Thus, the utterance "own" is lost. However, in this dropout situation, the feedback module 326 of the invention detects this condition, which is signaled to switch 318, which in turn again directs the signal to buffer 322. A signal accumulates in buffer 322 until time $t_4$, when the channel 308 again becomes ready, as detected by feedback mechanism 326. Again the buffer 322 begins releasing the signal to TSM 324, which generates an output signal at a compressed time scale, and again signal I "catches up" to signal N, during the period between times $t_4$ and $t_5$.

The invention is not limited by any specific apparatus for performing the time scale modification. Any apparatus that can perform a modification that preserves the information content or important aspect of the signal is considered to be within the contemplation of the invention.

If the information being transferred is, in fact, speech, such as a typical radio transmission, a particularly useful embodiment incorporates an additional component, shown in dotted line in FIG. 3. It is helpful to pass the signal through a speech modeling element 328 that reduces the bandwidth required to transmit a given signal. The bandwidth is reduced by modeling speech according to certain parameters which can be expressed with fewer digital bits than the digitized speech can be expressed. For instance, a particularly efficient speech modeling system is known as "Improved Multi-Band Excitation" ("IMBE"), and is available for licensing from Digital Voice Systems, Inc., of Cambridge, Mass.

IMBE is also fully described in a Patent Cooperation Treaty patent application entitled "Methods for Speech Quantization and Error Correction," PCT/US91/09135, in the names of Jae S. Lim and John C. Hardwick, filed on Dec. 4, 1991, assigned to Digital Voice Systems, Inc. of Cambridge, Mass. and published on Jun. 25, 1992, which is incorporated fully herein by reference. The IMBE model is principally described in the appendix to the PCT application. Further techniques also useful in connection with the IMBE model including a particularly useful error checking and protection method for use with such a speech model, are described in APCO/NASTD/Fed - Project 25 Vocoder Description Version 1.1, Telecommunications Industry Association (TIA) Document No. P25.921201.8.1, Jan. 11, 1993, Washington, D.C., which is fully incorporated herein by reference.

Figure 2A:
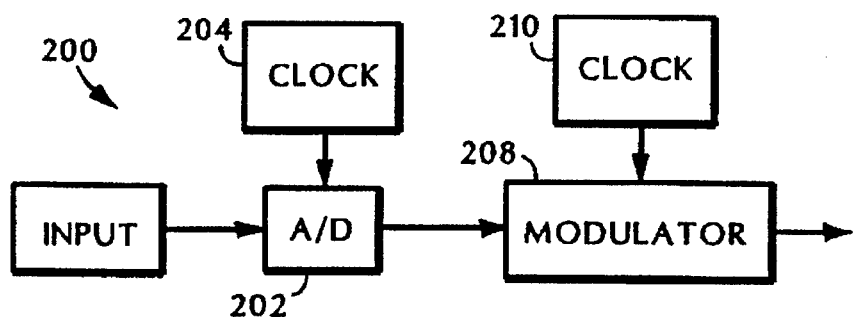
FIG. 2A is a schematic representation of a multi-clock data signal transmission system, which experiences the data rate regulation problem that the present invention overcomes.
Figure 2B:
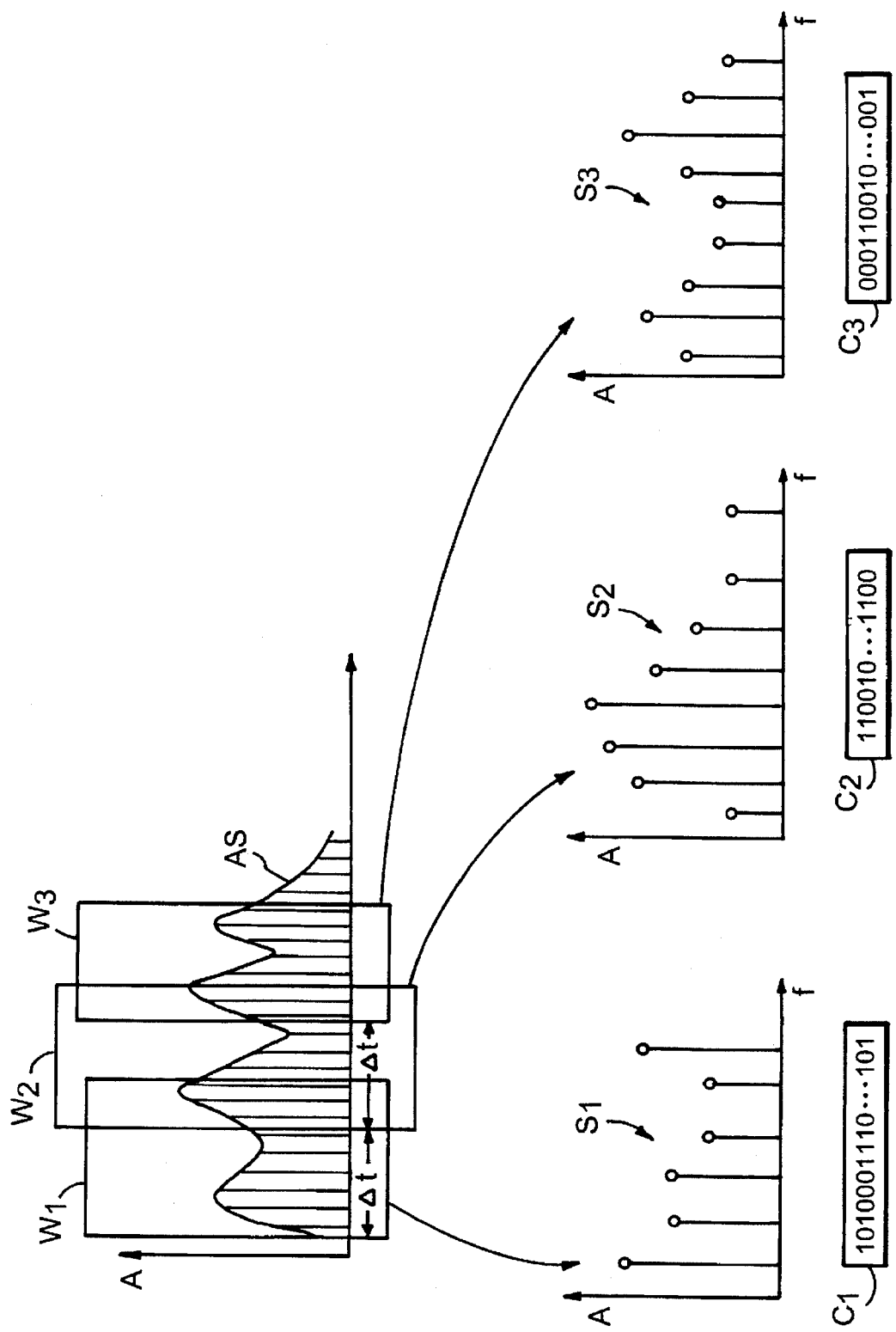
FIG. 2B is a schematic representation showing how an analog signal representing speech can be converted into a digital signal.

In general, as shown in FIG. 2B, according to the IMBE model, the A/D converter 302 digitizes signal AS into samples through a moving window, such as a Hamming window. One window of digital data is treated at a time. Each successive window $W_1$, $W_2$, $W_3$, etc. treats a portion of the signal of the same duration, beginning some time $\Delta t$ after the beginning of the previous window. Typically, the duration of a window is 28 milli seconds and the gap $\Delta t$ between the beginning of one window and the beginning of the next is on the order of 20 milli seconds. Thus, an overlap of 8 milli seconds is included in both windows.

For each window, the digitized signal is transformed into the frequency domain, for instance by using a Fast Fourier transform, where it is represented by a spectrum $S_1$, $S_2$, $S_3$, etc. The fundamental frequency of each window is estimated, as well as the spectral envelope (i.e. the magnitudes of the harmonics of the fundamental frequency). The window is divided into a number of frequency bands, on the order of from 3 to 15, and a decision is made about each band whether it represents voiced or unvoiced speech components.

This set of three parameters (fundamental frequency, spectral envelope, and voiced character) is enough to characterize the window of speech. Typically, the parameters can be coded as strings $C_1$, $C_2$, $C_3$, etc. of 1's and 0's with far fewer digital bits than would be used to code the speech without modeling. At the receiver end, a decoder decodes the model parameters and synthesizes speech using the model parameters by generating windows of synthesized, digital speech, representing the same duration as the windows on the input side and with the same gap $\Delta t$ between windows.

If a model having the characteristics of the IMBE model is used, it is relatively straightforward to apply a time scale modification. In fact, by changing the relative $\Delta t$ for the generation of input frames, as compared to output frames, the time scale of the speech is compressed (or expanded) without any compromise of the information content. For instance, if for the input frames $\Delta t$ is 22 milliseconds and for the output frames, ∆t is 20 milliseconds, the output speech will be faster. The pitch and other model parameters, such as magnitudes, voiced/unvoiced, etc. remain the same. The speech simply sounds faster, as if the speaker is speaking faster. This technique can be applied in the speech encoder or the speech decoder (or both).

Figure 5A:
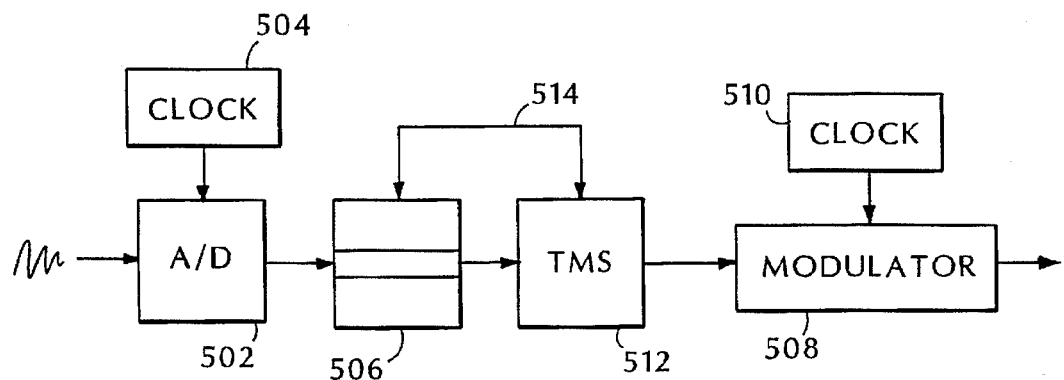
FIG. 5A is a schematic block diagram showing the components of a signal transmission line, having two transceiver components, an A/D convertor and a modulator, each under the control of a separate clock.

Another embodiment of the invention is shown schematically in FIG. 5A. This embodiment addresses the problem of the prior art illustrated in part by FIG. 2, namely a skew in timing due to clock drift. The apparatus, as described above, takes an analog signal as an input to A/D converter 502, which operates under the influence of the first clock 504. For a specific number of n pulses of clock 504, A/D converter sends a signal component to buffer 506. At the other end of the transceiver channel, modulator 508 takes a packet of signal components of a certain size from TSM 512. Modulator 508 is designed to accept a signal packet every w pulses of clock 510. Clocks 504 and 510 are assumed to have a different nominal frequency, and also to have different inaccuracies, or drift.

Following on the same example as above, it can be assumed that clock 504 generates 16,000 pulses every second. A/D converter generates one sample every 20 pulses, or 200 samples every ¼ second (800 samples every second). It can be assumed that clock 510 generates 8000 pulses every second. Modulator 508 is designed to accept a packet of 200 samples every 2000 pulses, or every ¼ of a second.

If both clocks maintain accurate pulses, A/D converter 502 will provide 200 samples to buffer 506 every ¼ second, and Modulator 508 will take a packet of 200 samples from TSM 512 (and thus from buffer 506) every ¼ second. The number of samples in buffer 506 will increase by 200 over the course of ¼ second, and then drop down to the starting number, whatever that may be. If, however, clock 510 drifts to slow down so that it takes a packet of 200 samples during the time that A/D converter produces 206 samples, six more samples will be added to the buffer than are taken from it every ¼ second. Eventually, buffer 506 will fill up, no matter how large it is. Conversely, if clock 510 drifts to speed up, so that it takes a packet of 200 samples during the time that A/D converter produces only 192 samples, eventually buffer 506 will become empty, no matter how full it is to begin with.

If the buffer becomes full, new data from the A/D converter will not be handled properly, and some data will be lost. If the buffer becomes empty, there will be no data to feed modulator 508, and spurious signals will be generated.

The foregoing problem is a result of the mismatch in the data rates of the modulator 508 and the A/D converter 502. Each are designed to run at a rate of 800 samples per second. However, as compared to a standard, control clock, one has drifted to a rate of more than 800 samples per second, and the other has drifted to some other rate.

The apparatus of the invention solves the data rate mismatch problem, as shown schematically in FIG. 6. FIG. 6 compares two values, each of which vary with time. In graph A, the fullness of buffer 506 is illustrated, with the amplitude of curve 600 indicating the fullness of the buffer over time. Two limit levels, a high and a low level, are indicated by lines 602 and 604 respectively. If the buffer 506 becomes more full than the high limit, this fact is communicated to TSM 512 over control line 514 and TSM module 512 will take action to reduce the fullness of the buffer. If the buffer 506 becomes less full than the low limit, TSM module 512 will take action to increase the fullness of the buffer.

The action that TSM 512 takes is shown in the second graph, B. The horizontal scale of graph B is also time, coordinated with the time scale of graph A. The dotted line indicates the nominal number of samples included in a packet by TSM 512, if the buffer fullness level indicates that the two clocks 510 and 504 are mutually within an acceptable range from their respective rates. For the example mentioned above, this nominal rate is 200 samples per packet. If, however, the buffer becomes too full, i.e., the clock 510 is running too slowly as compared to the clock 504, such as between the times $t_1$ and $t_2$, the TSM 512 acts to take more than 200 samples e.g. 206 samples, from the buffer 506 for every 2000 clock pulses of clock 510, and to transform this extra large packet size into a packet of 200 samples, which modulator 508 can accept. (Modulator 508 can only handle a packet size of exactly 200 samples.) The method by which TSM compresses the 206 samples into 200 samples is not part of the invention, and will depend on the type of data. Practitioners of ordinary skill in the art will understand various ways that N+x samples can be transformed into N different samples, while maintaining the important aspects of the signal. For example, one complete period of a periodic signal could be removed to transform N+x samples to N samples, where x is the period, while still maintaining the signal periodicity. TSM 512 compresses N+x samples into N samples, which decreases the TSM output data rate relative to the A/D 502 data rate. (By data rate, it is meant the number of samples per time. The "information rate" or "message rate", denotes the amount of information that is transferred per time. The information rate of the TSM 512 output increases relative to the information rate of the A/D convertor 502.)

Thus, during the time interval $t_1$ to $t_2$ TSM 512 will take out more than N samples for each 2000 clock cycles of clock 510, the number varying depending on how many excess samples were in buffer 506. These N+x samples will be compressed into a packet of N samples, and the number of excess samples in buffer 506 will decrease, until the level is between the high and low limit levels.

If the situation reverses, so that the buffer 506 becomes too empty, such as at $t_3$, TSM module 512 starts to take fewer than N samples from the buffer during the time period $t_3$ to $t_4$ and transforms that N−y samples into N samples, until the level of samples in buffer 506 returns to a level between the low and high limit levels. (Again, practitioners skilled in the art are aware of techniques for transforming N−y samples into N samples, while maintaining the integrity of the data.) Because TSM 512 essentially transmits N−y samples during the time that normally N samples are transmitted, TSM decreases the data rate, relative to the data rate A/D converter transmits data. TSM 512 expands N−y samples into N samples, which increases the TSM 512 output data rate relative to the A/D 502 data rate.

This process continues, with TSM 512 continuously monitoring the level of buffer 506, and adjusting the number of input samples that are transformed into N output samples accordingly. By wisely choosing the manner in which TSM 512 brings the sample size either up or down, the integrity of the signal can be maintained, despite the clock skews.

The relationship between the fullness of the buffer, and the number of samples per packet is shown schematically in FIG. 6. During the time interval between time t0 and $t_1$, the buffer contents are between the low limit and the high limit. However, at time $t_1$, the contents of the buffer exceed the high limit, indicating that the relative speed of clock 504 is faster than the speed of clock 510, and thus, the modulator is not taking samples at a rate fast enough to keep up with the samples that the A/D converter 502 is generating. Without the invention, if this imbalance were to persist, eventually buffer 506 would become full, and then overflow, with data being lost.

With the invention in place, however, at time $t_1$, the TSM 512 begins increasing the number of samples per packet to reduce the excess in the buffer, and, to prevent the excess in the buffer from growing so large that data is lost. By time $t_2$, due to the action of the TSM, and, perhaps, other, compensating mutual drifts of clocks 504 and 510, the level of buffer 506 has been reduced to below the high level, and so the TSM returns to including only N samples per packet.

During the time between $t_2$ and $t_3$ the buffer remains in this interval. However, at $t_3$, the buffer contents fall below the low level. If this situation were allowed to persist, eventually, the buffer would empty out and there would be no data available when the modulator 508 called for the next signal. To compensate for this situation, TSM creates packets of samples with fewer than N samples per packet, according to well known methods. TSM maintains the packet size at fewer than N samples, until the A/D converter has a chance to catch up to modulator 508, and the buffer fullness level is once again within the range between the low and high levels.

Although the example has been shown using a low and high level limit in the buffer, this is not necessary. A single threshold can be used, or more than two thresholds can be used, with more complicated relationships between the degree of time scale modification and the fullness of the buffer being used, as is well known in the art.

Figure 5B:
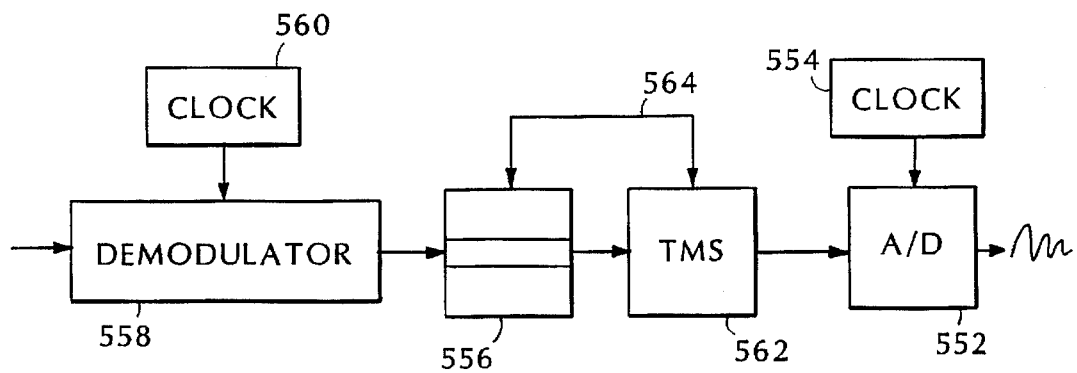
FIG. 5B is a schematic block diagram showing the components of a signal transmission line, having two transceiver components, a D/A convertor and a demodulator, each under the control of a separate clock.

The invention can also be applied to an apparatus as shown in FIG. 5B, which includes a demodulator 558, a buffer 556, a TSM module 562 and a digital to analog (D/A) convertor 552. Demodulator 558 operates under the influence of clock 560 and D/A convertor 552 operates under the influence of clock 554. Just as A/D convertor 502 and modulator 508 may drift from their optimum, matched data rate, so to can demodulator 558 and D/A convertor 552 drift, due to variations in their respective clocks 560 and 554. Interposing buffer 556 and TSM 562, which may receive signals indicating the fullness of buffer 556 over control line 564, solves the problem in the same manner as discussed above with respect to the embodiment shown in FIG. 5A.

If the buffer 556 becomes too full, i.e., the clock 554 is running too slowly as compared to the clock 560, the TSM 562 acts to take more than the standard number of samples from the buffer 556 and to transforms this larger packet into a packet of a size D/A convertor 552 can accept. Conversely, if the buffer 556 becomes too empty, i.e., the clock 554 is running too quickly as compared to the clock 560, the TSM 562 acts to take fewer than the standard number of samples from the buffer 556 and to transforms this smaller packet into a packet of a size D/A convertor 552 can accept.

Figure 8:
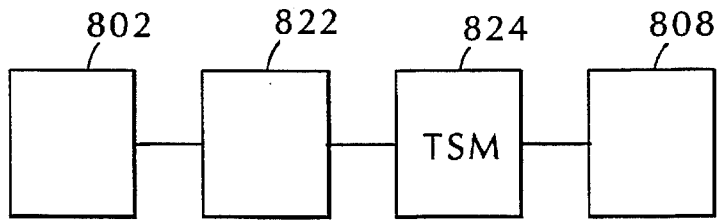
FIG. 8 is a schematic block diagram showing the components of a generic embodiment of the apparatus of the invention, that encompasses both specific examples illustrated in FIGS. 3 and 5.

It will be understood from the foregoing that the embodiment of the invention that deals with voice transmission over a channel, illustrated in FIG. 3, and the embodiment of the invention that deals with clock drift illustrated in FIG. 5A, are species of a generic apparatus, which is illustrated schematically in block diagram form in FIG. 8. Two signal transceiver elements 802 and 808 are members of a signal transmission line. Transceivers 802 and 808 operate such that a mismatch can arise between the data rates they are capable of sending and receiving, respectively. For example, element 808 can be a radio channel, such as element 308 of FIG. 3. Or, it can be a modulator such as element 508 of FIG. 5A, under the influence of clock 510. Similarly, element 802 can be an A/D converter, as element 302 of the radio transmission example of FIG. 3, or as element 502 of the signal transmission line of FIG. 5A, under the influence of clock 504.

As explained above, mismatches can arise between the data rates of elements 802 and 808. To overcome this mismatch, a buffer 822 is interposed between transceivers 802 and 808. The buffer acts as a reservoir to which data can be stored when downstream elements are not ready to receive data or from which data can be drawn when downstream elements are ready to receive data but upstream elements are not transmitting data quickly enough. A time scale modification element 824 is used to adjust the rate at which data signals are passed from buffer 822 to transceiver 808, in order to accommodate the mismatch in data rates.

As has been mentioned above, various ways exist for controlling the TSM 824. Limit levels can be established in the buffer 822, with the TSM being driven according to the state of the buffer relative to the limit levels. Alternatively, or in combination, a dedicated monitor of the receive ready state of transceiver 808 can be implemented, which directs whether information will be routed to the TSM, or around it.

Figure 7:
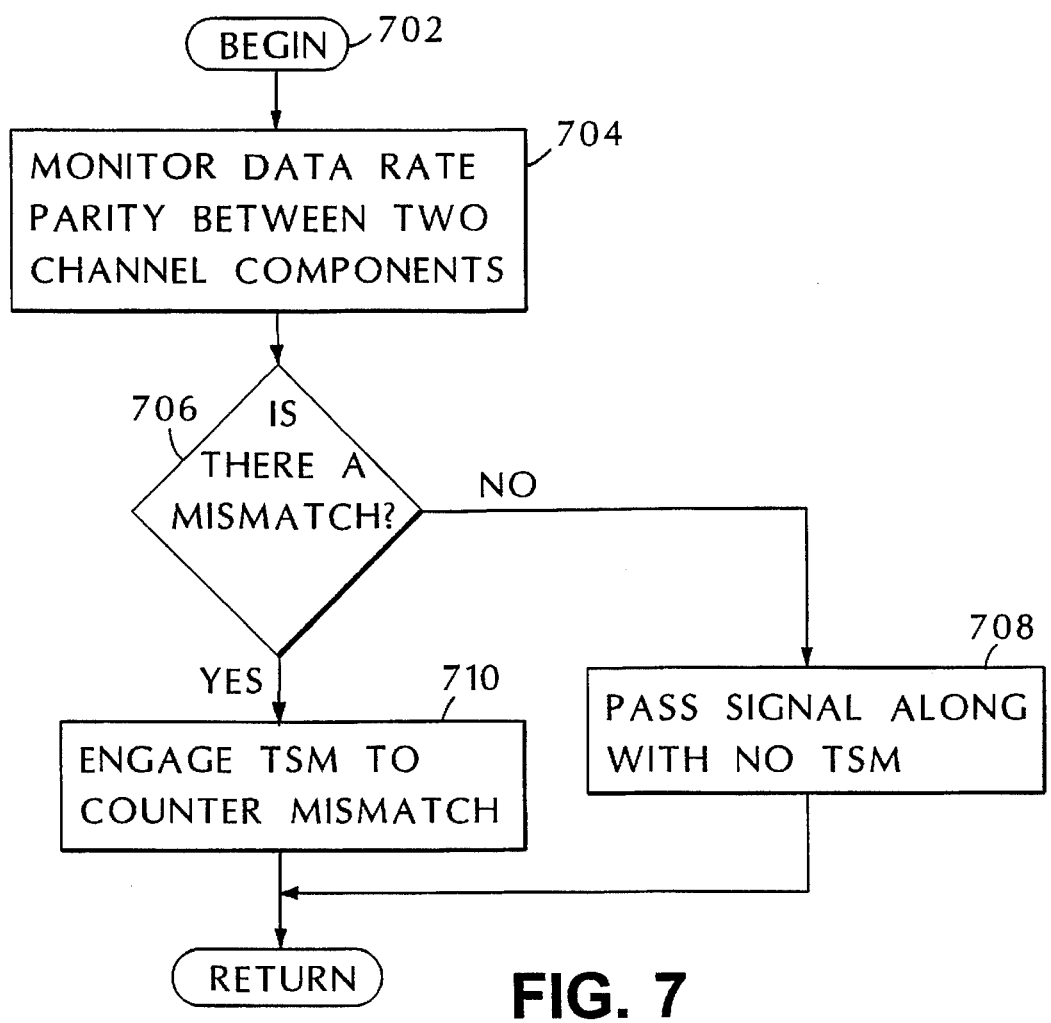
FIG. 7 is a schematic representation in flowchart form of a preferred embodiment of the method of the invention.

The method of the invention is discussed with reference to FIG. 7. According to a generic method, which encompasses both methods discussed above, the process begins at 702. At 704, an element of the system monitors the match between the data rates of two sequential channel components. This may be referred to as data rate "parity." For instance, in connection with the radio transmission example discussed above, monitoring is conducted by the feedback module 326, which examines whether the channel is ready, when a signal is presented to switch 318. If the channel is not ready, there is a mismatch between the data rates of the A/D converter 302, which is a positive value, and the channel 308, which is zero.

Similarly, in connection with the clock drift example, the TSM monitors the buffer level, as compared to the high and low limits. If the buffer level exceeds the high limit, or falls below the low limit, there is a mismatch.

Whether or not there is a mismatch is determined at 706. If there is no mismatch, the signal passes along to 708 without any time scale modification. With the radio transmission example, this is accomplished by routing the signal around TSM 322. With the clock drift example, it is accomplished by the TSM generating packets with the nominal number of samples N per packet. (In the clock drift situation, it is typically not a problem to have a small permanent time lag resulting from constantly running the signal through a buffer.) If, however, there is a mismatch, the method branches to 710, and some sort of time scale modification is implemented. In connection with the speech transmission module, the time scale modification can be accomplished by altering the window shift $\Delta t$. In connection with the clock drift example, the time scale modification can be accomplished by including more or fewer samples in the packet, according to known methods.

Thus, the apparatus and method of the invention accomplish the objects set forth above. Mismatch of data rate readiness in sequential components is accommodated without the loss of data, and without a permanent time lag, in situations where avoiding a permanent time lag is important. It is possible to accommodate both the situation where data signals are transmitted relatively too quickly by the upstream transceiver as well as the situation where the upstream transceiver does not transmit data signals quickly enough. The invention can be used to accommodate the initial "warm up" period of channels, such as radio transmission channels, as well as mutual clock drifts. Further, in the case of the transmission of a data signal that represents speech, the apparatus of the invention accomplishes the foregoing goals without unduly distorting the sound of the transmitted signal. The only artifact of the application of the invention is that the speech is faster. However, there is no change in pitch, or other important speech parameters.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims. The signal transmitted need not be speech. The transmission line need not be a radio channel. There need be no explicit clocks driving various signal elements. If the signal is speech, or a similar signal, the speech model used need not be the IMBE model discussed. The TSM can be accomplished by any suitable method.

Having described the invention, what is claimed is:

1. An apparatus for minimizing the effects of mismatch between the data rate states of at least first and second transceiver components in a signal transmission line for transmitting an original time varying data signal, said apparatus comprising:
   a. a buffer means for storing signal components, located between said first and second transceivers; and
   b. a data rate matching means for receiving a signal at a data rate that matches the data rate state of said first transceiver component and transmitting a signal at a data rate that matches the data rate state of said second transceiver component.

2. The apparatus of claim 1, said data rate matching means further comprising time scale modification ("TSM") means for modifying the time dependence of signals received from said buffer.

3. The apparatus of claim 2, said TSM means comprising means for transmitting a signal at a data rate that matches the data rate state of said second transceiver component despite receiving a signal at a different data rate.

4. The apparatus of claim 3, said data rate matching means further comprising means for determining the degree of mismatch between the data rate states of the first and second transceivers.

5. The apparatus of claim 4, said means for determining the degree of mismatch comprising at least one limit level of said buffer means.

6. The apparatus of claim 2, said data rate matching means further comprising means for determining if the data rate state of said second transceiver component is open or closed.

7. The apparatus of claim 6, said data rate matching means further comprising switch means for directing signals from said first transceiver means to pass either into said buffer means, or to pass around said buffer means.

8. The apparatus of claim 7, said switch means comprising means for directing signals into said buffer means if said second transceiver component data rate state is closed.

9. The apparatus of claim 8, said TSM being located between said buffer means and said second transceiver component.

10. The apparatus of claim 9, said means for modifying the time dependence of signals comprising means for decreasing the data rate with respect to time of signals transmitted from said TSM, as compared to the data rate of signals transmitted to said TSM.

11. The apparatus of claim 10, said original time varying data signal corresponding to an acoustic speech signal, said means for decreasing the data rate comprising means for creating a modified data signal corresponding to an acoustic signal having the same pitch characteristics as said original acoustic speech signal.

12. The apparatus of claim 8, said switch means comprising means for directing signals to pass around said buffer means if said second transceiver component is open and if said buffer has become empty.

13. The apparatus of claim 2, said means for modifying the time dependence of signals comprising means for decreasing the data rate with respect to time of signals transmitted from said TSM, as compared to the data rate of signals transmitted to said TSM.

14. A method for minimizing the effects of mismatch between the data rate states of at least first and second transceiver components in a signal transmission line for transmitting an original time varying signal, said method comprising the steps of:
   a. monitoring the data rate parity between said first and second transceiver components;
   b. if there is a mismatch in data rates modifying the time scale of signals received by said second transceiver relative to corresponding signals transmitted by said first transceiver; and
   c. if there is no mismatch, allowing the signal to be transmitted from said first transceiver component to said second transceiver component without any time scale modification.

15. The method of claim 14, said step of modifying the time scale of signals comprising the step of storing components of said signal in a buffer.

16. The method of claim 15, if the monitoring step indicates that the data rate of said second transceiver component is zero, said modifying the time scale step comprising:
   a. monitoring the data rate state of said second transceiver component noting if it has become non-zero;
   b. receiving signals from said buffer and modifying said signals such that the time scale of said signals is compressed;
   c. transmitting said compressed time scale signals to said second transceiver component; and
   d. repeating the receiving and transmitting steps b and c until the buffer becomes empty.

17. The method of claim 15:
   a. said monitoring step comprising the step of monitoring the fullness of said buffer relative to at least one predetermined limit level; and
   b. said modifying step comprising, if said buffer is more full than at least one of said limit levels the step of compressing the time scale of signals received by said second transceiver relative to corresponding signals transmitted by said first transceiver.

18. The method of claim 17, said modifying step further comprising, if said buffer is less full than at least one of said limit levels the step of expanding the time scale of signals received by said second transceiver relative to corresponding signals transmitted by said first transceiver.

19. An apparatus for minimizing the effect of data rate mismatch between two transceiver components in a signal transmission line, said apparatus comprising:
   a. a first transceiver component, under the control of a first clock;

b. a second transceiver component, under the control of a second clock;

c. buffer means for receiving a signal from said first transceiver means;

d. time scale modification means between said first and second transceiver components for modifying the time scale of the signal transmitted to the second transceiver component relative to the time scale of the corresponding signal received from said first transceiver component.

20. An apparatus for preparing a time varying signal to be transmitted over a signal channel that experiences timewise interruptions in the continuity of the channel when the channel is not able to accept a signal, said apparatus comprising:

a. buffer means for receiving said signal, storing a running, varying, timewise slice of said signal, and transmitting said signal after storage;

b. connected to said buffer means, means for detecting the continuity status of said channel;

c. connected to said buffer means, means for compressing said signal with respect to time; and d. connected to said buffer means and said means for detecting, means for directing said signal through said buffer means and time compressing means if said channel is not ready to receive said signal.

21. An apparatus for preparing a time varying signal representing speech to be transmitted over a signal channel that experiences timewise interruptions in the continuity of the channel when the channel is not able to accept a signal, said apparatus comprising:

a. means for generating a digital signal corresponding to a spoken signal;

b. buffer means for receiving said digital signal, storing a running, varying, timewise slice of said digital signal, and transmitting said digital signal after storage;

c. connected to said buffer means, means for detecting the continuity status of said channel;

d. connected to said buffer means, means for compressing a selected portion of said digital signal with respect to time, as compared to non-selected portions of the digital signal; and e. connected to said buffer means and said means for detecting, means for directing said digital signal through said buffer means and time compressing means if said channel is not ready to receive said signal.

22. The apparatus of claim 21, further comprising means for transforming the digital signal into a frequency domain signal, made up of components representing timewise sequential segments of said digital signal each segment beginning an equal shift in time after the beginning of the previous segment.

23. The apparatus of claim 22, said means for compressing said digital signal with respect to time comprising means for changing the magnitude of the shift in time for said selected portions of said digital signal, as compared to the magnitude of the shift in time for non-selected portions.

24. The apparatus of claim 23, further comprising synthesizer means for transforming said frequency domain signal into a synthesized time domain signal, said synthesizer means making no distinction in its treatment of different components of the frequency domain signal due to the magnitude of the shift in time that characterized the segment of the digital signal from which that component of the frequency domain signal had been created.

25. The apparatus of claim 21, further comprising an encoder for transforming the digital signal into a frequency domain signal using the model parameters associated with the Improved Multi-Band Excitation ("IMBE") speech model.

* * * * *

UNITED STATES PATENT AND TRADEMARK OFFICE
CERTIFICATE OF CORRECTION

PATENT NO.   : 5,649,050

DATED        : July 15, 1997

INVENTOR(S)  : John C. Hardwick and Jae S. Lim

It is certified that error appears in the above-identified patent and that said Letters Patent is hereby corrected as shown below:

Cover page, [56] References Cited, U.S. PATENT DOCUMENTS, insert the following:

--5,425,027  6/1995  Baran .......... 370/69.1--

Column 8, lines 33, 35, 58, and 67, "At" should be --$\Delta$t--.

Column 9, line 1, "At" should be --$\Delta$t--.

Column 10, line 62, "FIG. 6" should be --FIGS. 6a and 6b--.

Column 10, line 62, "t0" should be --$t_0$--.

Column 11, line 38, "to" should be --too--.

Signed and Sealed this

Twenty-sixth Day of May, 1998

Attest:

BRUCE LEHMAN

Attesting Officer

Commissioner of Patents and Trademarks